United States Patent [19]

Fisher

[11] Patent Number: 4,785,509

[45] Date of Patent: Nov. 22, 1988

[54] HOOK FOR ROPE USED TO PULL A BOAT INTO A DOCK

[76] Inventor: Sidney L. Fisher, 16428 S.E. 149th, Renton, Wash. 98056

[21] Appl. No.: 123,048

[22] Filed: Nov. 19, 1987

[51] Int. Cl.$^4$ .............................................. A44B 13/00
[52] U.S. Cl. .............................. 24/230.5 R; 24/129 R
[58] Field of Search ................. 24/230.5 R, 230.5 AD, 24/230.5 TP, 129; 248/340

[56] References Cited

U.S. PATENT DOCUMENTS

| | | |
|---|---|---|
| 59,890 | 11/1866 | Bristol. |
| 749,235 | 1/1904 | Smith .................................. 24/129 R |
| 1,422,228 | 7/1922 | Shaffer ............................. 24/230.5 R |
| 1,629,095 | 5/1927 | Danly ............................... 24/230.5 R |
| 1,718,641 | 6/1929 | Forman. |
| 1,807,314 | 5/1931 | Humphreys et al.. |
| 2,314,354 | 3/1943 | Jefferson ......................... 24/230.5 R |
| 2,381,531 | 8/1945 | Ehmann ............................ 24/230.5 R |
| 2,384,497 | 9/1945 | Siler .................................... 294/74 |
| 2,595,806 | 5/1952 | Morris .................................. 24/129 |
| 2,992,465 | 7/1961 | Gale ..................................... 24/73 |
| 3,192,760 | 7/1965 | Timberlake .......................... 72/341 |
| 3,495,431 | 2/1970 | Landon ........................... 24/230.5 R |
| 4,414,712 | 11/1983 | Beggins ............................. 24/129 R |
| 4,622,724 | 11/1986 | Dupre .................................. 24/130 |

*Primary Examiner*—Victor N. Sakran
*Attorney, Agent, or Firm*—Delbert J. Barnard

[57] ABSTRACT

Disclosed is a hook which may be attached to an end of a rope and used to pull a boat into dock. The hook has an elongated shank having first and second ends and an end opening in the first end of the shank into which a rope may be received. A single tine extends from the second end of the shank and has a free end spaced from the shank. The shank has a substantially wide and flat surface directed towards the tine which together with the tine forms a hook throat. The first end of the shank, from which the rope may extend, is beveled to form an obtuse angle with the flat throat surface of the shank. When the hook is attached to a rope and is thrown over an object, the rope may be retracted to pull the hook toward the object such that contact of the angled first end of the shank against the object, in cooperation with the weight of the tine causes the hook to align itself such that the tine will engage the object.

17 Claims, 4 Drawing Sheets

U.S. Patent  Nov. 22, 1988  Sheet 1 of 4  4,785,509
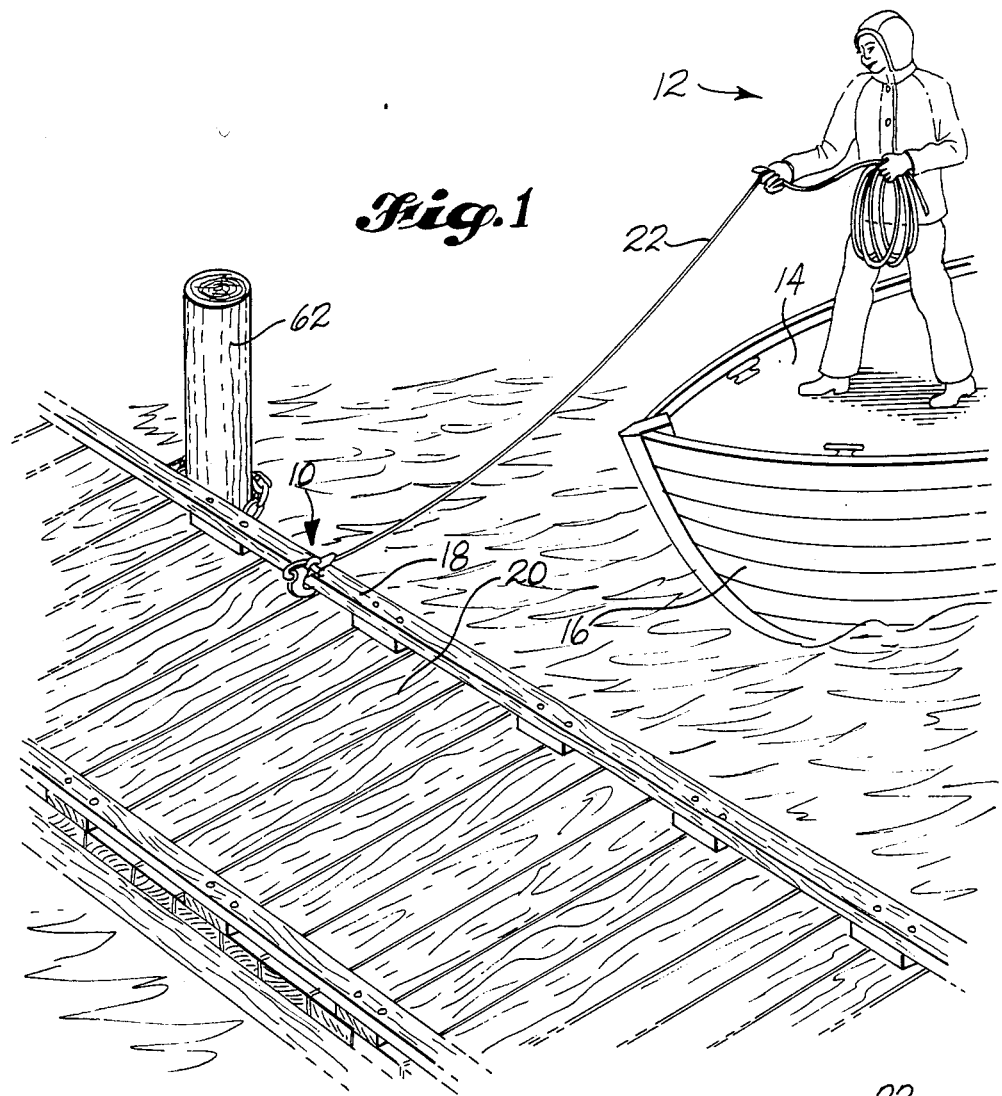
Fig.1
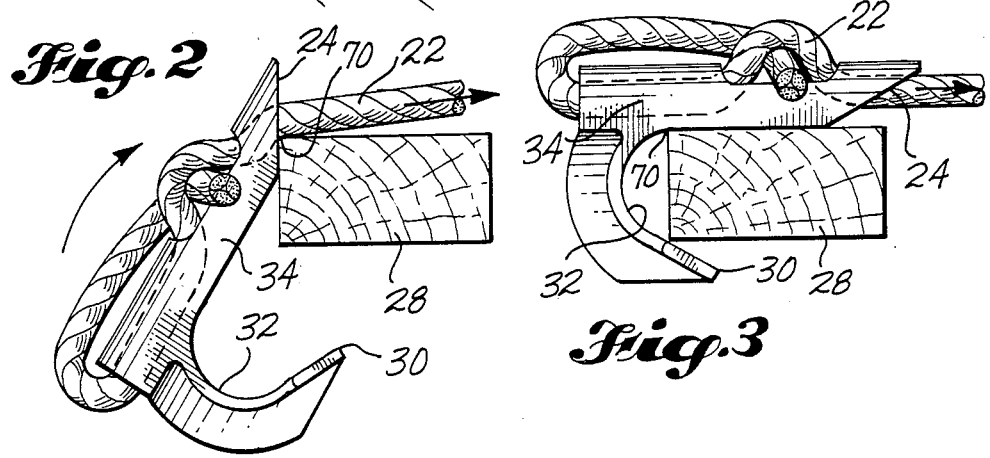
Fig.2
Fig.3

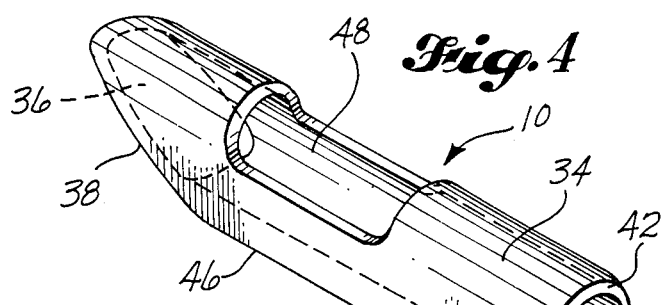
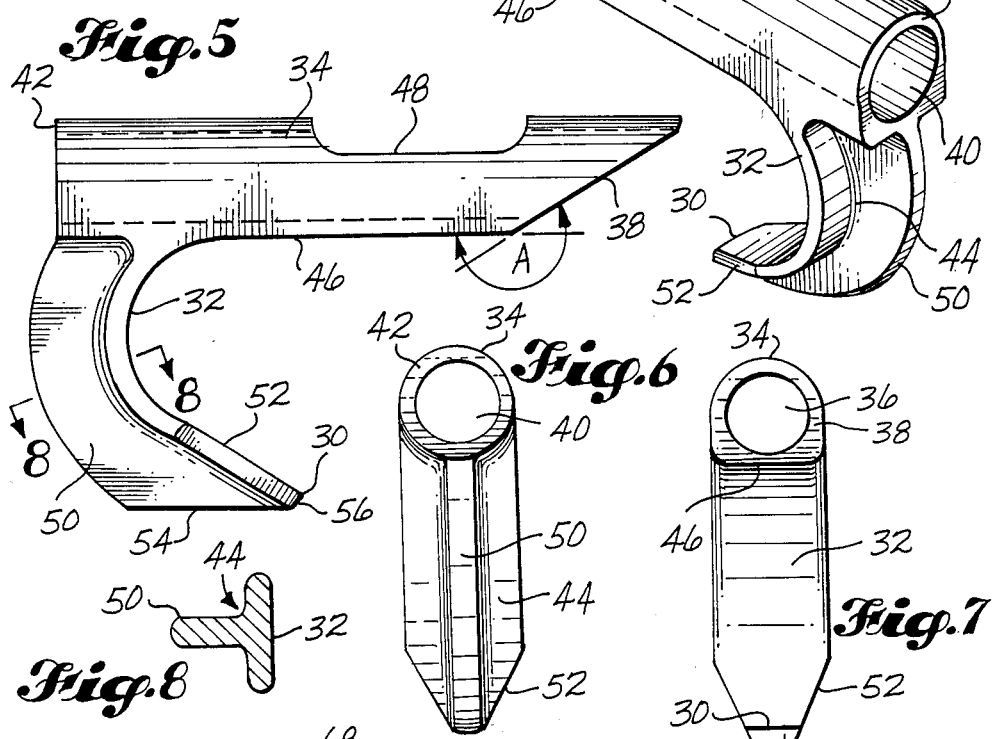
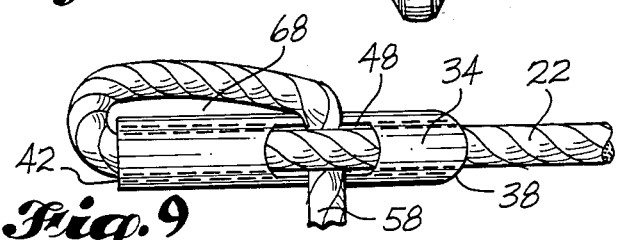
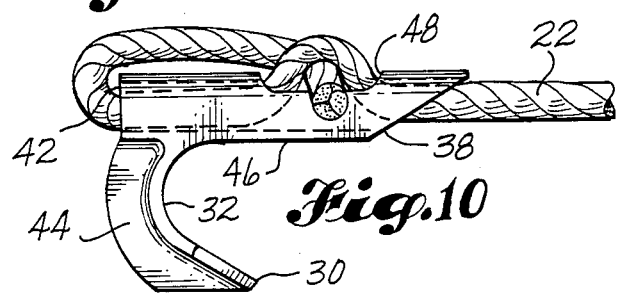

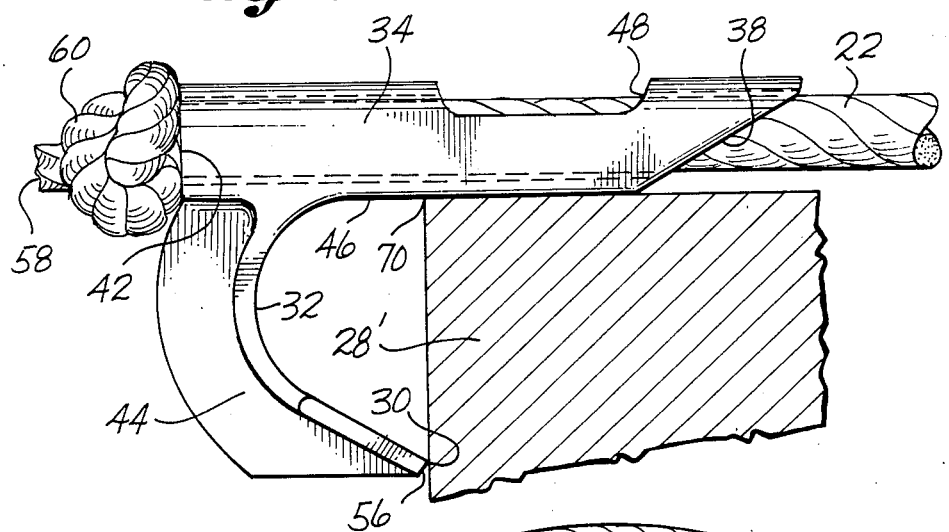
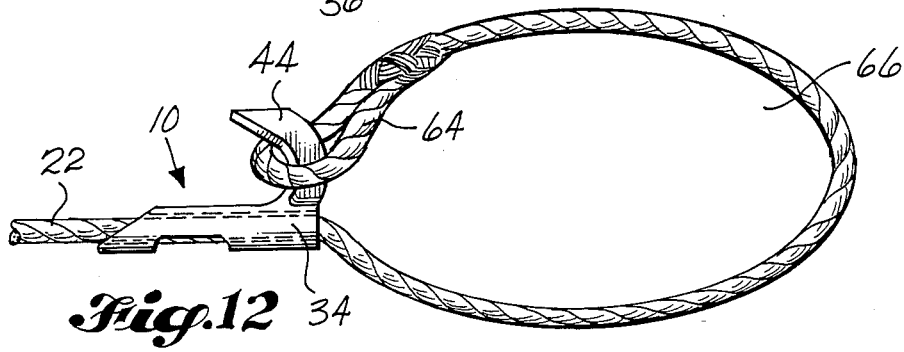
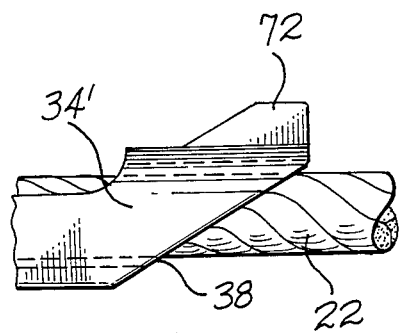
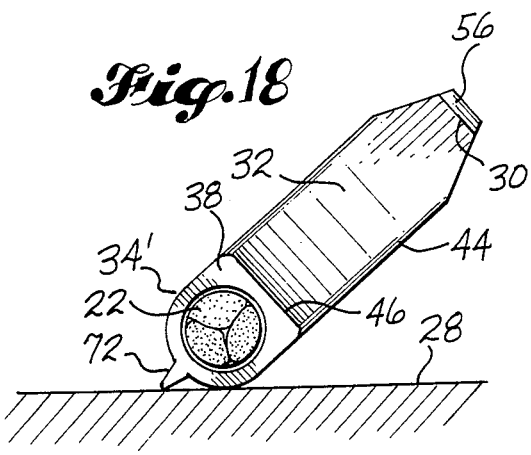

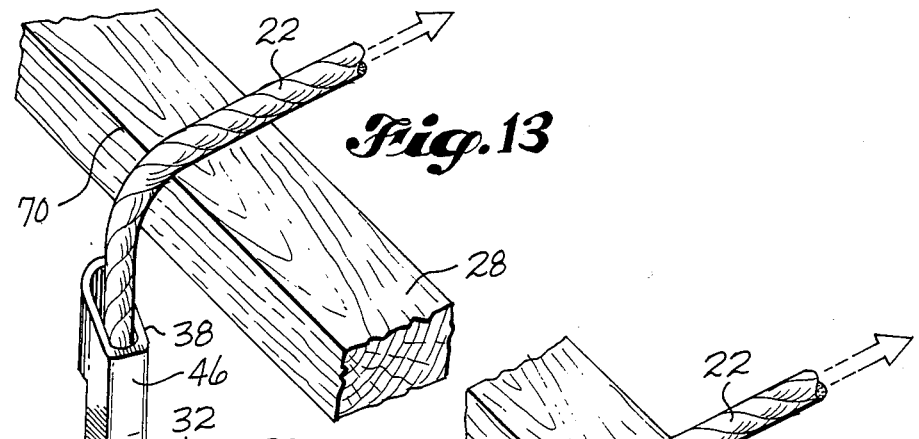
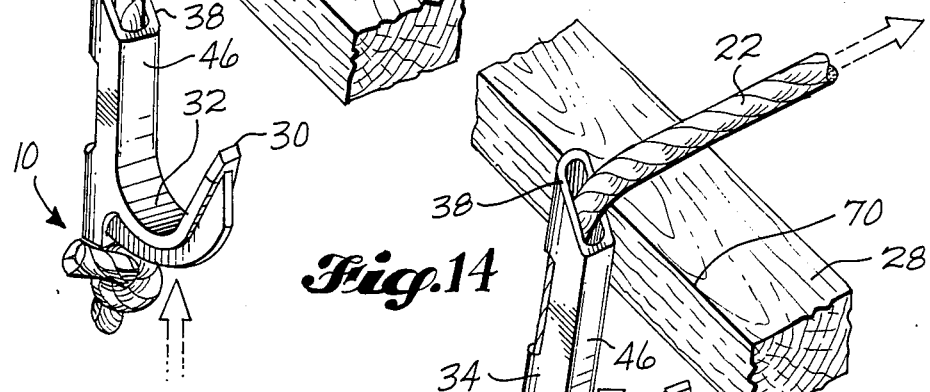
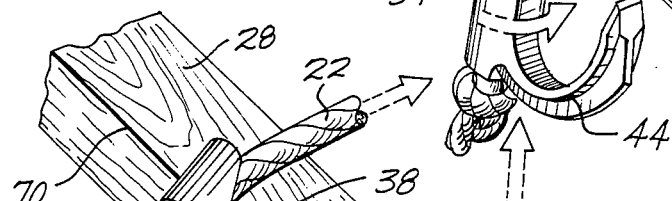
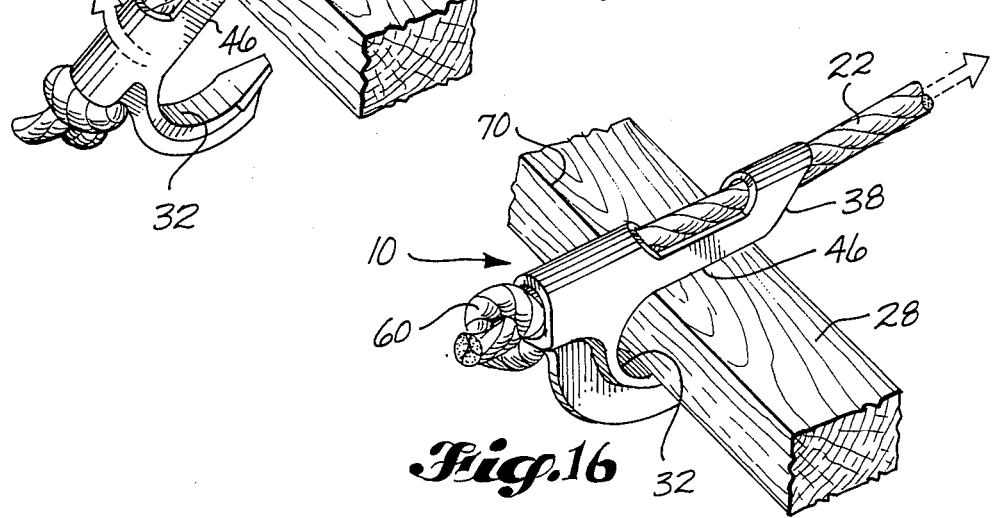

HOOK FOR ROPE USED TO PULL A BOAT INTO A DOCK

DESCRIPTION

1. Technical Field

This invention pertains to hooks which may be attached to an end of a rope, and particularly to a hook which will self align a single tine to grasp an object over which it has been thrown.

2. Background Art

When a boat approaches a dock, it is a common practice for a person aboard the boat to jump off of the boat onto the dock for the purpose of handling a rope used for pulling the boat into the dock. Sometimes the person leaves the boat with one end of the rope in hand. Unless another person is aboard the boat, this leaves the boat ungoverned while docking. At other times, the person jumps onto the dock and the rope is thrown to him/her. This practice can be dangerous in bad weather and/or under heavy wind conditions. Furthermore, it requires an extra person aboard the boat.

Alternatively, a rope having a loop at its end may be thrown in an attempt to snare a cleat on the dock, or a pile. This requires a certain degree of skill or numerous repeated attempts for success. Precise aim can be difficult from a moving boat and time may not permit repeated throwing and retrieving.

Using a multiple tine grappling hook attached to a rope can be an effective way to achieve a grip on the dock. However, the three-dimensional tine arrangement of the hook can present a serious hazard while on the deck of the boat and is awkward to store.

Prior to the present invention, using a single tine hook on a rope was unacceptable. When a conventional single tine hook is thrown over the edge of an object, there is only a small probability, that when the rope is retracted, the tine will be properly oriented to grasp the edge of the object.

The present invention provides a solution to all of the above-mentioned shortcomings. These and other aspects and advantages of the invention will become apparent from the description and drawing.

DISCLOSURE OF THE INVENTION

The present invention provides a hook, attachable to a rope, which may be thrown from the deck of a boat over an object, such as a dock or dock rail, and then retracted to provide a firm attachment of the hook to the dock, thereby providing an extension of the rope between the dock and the boat. The hook of the present invention has an elongated shank which has a rope receiving opening at a first end and a tine fixed to the second end. The tine extends outwardly from the second end of the shank to a free end spaced from the shank defining a hook throat between them. The shank has a substantially wide and flat throat surface directed toward the tine and the first end of the shank has an oblique end surface which forms an obtuse angle with the flat throat surface of the shank. In use, a rope is secured to the hook, and the rope extends out from the end opening at the first end of the shank. The rope is held while the hook is thrown over an object. When the rope is retracted, contact of the first end of the shank with the object in combination with the weight of the tine cooperate to orient the hook such that the tine will engage the edge of the object.

In accordance with another aspect of the invention, the tine is curved inwardly with respect to the throat of the hook such that if the object has a thickness less than the distance between the shank and the free end of the tine, the object will be engaged in the throat of the hook. If the object has a thickness greater than the distance between the shank and the free end of the tine, the free end of the tine will engage the side surface of the object.

In accordance with yet another aspect of the invention, the shank may be tubular having an opening at each end. A rope may be passed through the shank from the first end, outwardly through the second end, and then knotted to provide attachment of the rope to the hook. Another method of attachment of the rope to the hook may be provided by forming a third opening in the upper wall of the tubular shank. The rope may be passed through the shank as described above and then the free end passed underneath the portion of the rope exposed by the third opening.

A hook of the above-described construction may be quickly and easily attached to or detached from the end of an ordinary rope. Furthermore, the hook is easily stored, occupying a relatively small amount of space, and will lie flat on a deck of a boat when not in use so as to present a minimal hazard. The hook may be constructed of any suitable durable material so long as it is of sufficient weight that it will lead when the rope is thrown.

BRIEF DESCRIPTION OF THE DRAWING

FIG. 1 shows a preferred embodiment of the invention in use, having been thrown onto a dock by a person on the deck of a boat and then retracted so as to engage the dock rail in the throat of the hook;

FIG. 2 illustrates the action of the beveled end of the shank with the edge of an object over which the hook has been thrown and is being retracted;

FIG. 3 illustrates a preferred embodiment of the invention having been retracted and engaging an object in the throat of the hook;

FIG. 4 is a pictorial view of a preferred embodiment of the invention;

FIG. 5 is a side view of a preferred embodiment of the invention;

FIG. 6 is an end view of a preferred embodiment of the invention showing the opening in the second end of the shank;

FIG. 7 is an end view of a preferred embodiment of the invention showing the opening in the first end of the shank;

FIG. 8 is a cross-sectional view taken substantially along line 8—8 of FIG. 5;

FIG. 9 is a top view of a preferred embodiment of the invention showing one manner of attaching a rope to the hook;

FIG. 10 is a side view of a preferred embodiment of the invention showing a manner of attaching a rope to the hook;

FIG. 11 is a side view of a preferred embodiment of the invention showing an alternate manner of attaching a rope to the hook and showing the hook engaging a object having a thickness greater than the distance between the shank and the tooth of the line;

FIG. 12 is a side view of a preferred embodiment of the invention showing an alternate use of the hook;

FIGS. 13–16 are sequential pictorial views of a preferred embodiment of the invention having been thrown over the edge of an object and being retracted into engagement with the object;

FIG. 17 is a fragmentary side view of an alternative embodiment of the invention showing the placement of the tipping member on the shank; and FIG. 18 is an end view of an alternative embodiment of the invention viewed downwardly as the hook is being retracted over the edge of an object.

BEST MODE FOR CARRYING OUT THE INVENTION

Referring to the several figures of the drawing, FIG. 1 illustrates a preferred embodiment of line hook 10 in use. A boat operator 12, positioned on a deck 14 of a boat 16 has thrown the hook 10 over a rail 18 of a dock 20 and has retracted the hook 10 into engaging contact with the rail 18 by pulling on an attached rope 22. The boat operator 12 has gained communication with the dock 20 via the rope 22 without the assistance of a second person and without having to leave the boat 16.

FIG. 2 illustrates with movement arrows the reaction of the hook 10 as the beveled end 24 of the shank 26 is engaged against an edge 70 of an object 28. FIG. 3 shows an object 28 having a thickness less than the distance between the shank 34 and the free end of the tine 30. The object 28 has been engaged in the throat 32 of the hook 10.

FIG. 4 shows the essential features of a preferred embodiment of the hook 10. The tubular shank 34 is shown having a first opening 36 at its first end 38 and a second opening 40 at its second end 42. A single tine 44 extends outwardly from the second end 42 of the shank 34. A hook throat 32 is formed between the tine 44 and the shank 34. The throat portion 46 of the shank 34 is a substantially wide and flat surface directed toward the throat area 32 of the tine 44. As shown in FIG. 5, an obtuse angle A is formed between the throat area 46 and the first end 38 of the shank 34. This preferred embodiment also has an elongated window opening 48 in the upper sidewall of the tubular shank 34. In a preferred embodiment, the tine 44 has a substantially flat surface at the hook throat 32. An outer strengthening portion 50 of the tine 44 is formed substantially perpendicular to the flat surface of the hook throat 32. In cross section, the tine 44 is substantially T-shaped, as shown in FIG. 8. The tine 44 is preferably constructed to be arcuately concavely curved relative to the throat area 32 and then having a straightened portion 52 at the free end of the tine 44. The straightened portion 52 of the tine 44 may also be tapered to decrease in width as it approaches the tip 30. The strengthening portion 50 of the tine 44 is also tapered in width in the portion 54 that approaches the tip 30. The tip 30 has a beveled edge 56 which creates a tooth substantially in a direction parallel with the flattened throat portion 46 of the shank 34.

FIG. 6 shows the second opening 40 in the second end 42 of the shank 34. The tapering straightened portion 52 of the tine 44 is shown in FIGS. 6 and 7. FIG. 7 also shows the first opening 36 in the first end 38 and the flattened throat portion 46 of the shank 34.

FIGS. 9 and 10 illustrate one method of attaching a rope 22 to the hook 10. In this embodiment, the free end 58 of the rope 22 is inserted into the first opening 36, through the tubular shank 34, out of the second opening 40, and then passed under the portion of the rope 22 which is exposed in the third opening 48. When the boat operator 12 retracts the rope 22, the free end 58 is captured between the rope 22 and the shank 34 at the third opening 48. An alternative method of connecting the free end 58 of the rope 22 to the hook 10 is shown in FIG. 11. The free end of the rope 58 is passed through the tubular shank 34 from the first end 38 to the second end 42 and then a not 60 is formed at the free end of the rope 58 such that when the boat operator 12 retracts the rope 22 the free end 58 will not return through the tubular shank 34.

The versatile design of a preferred embodiment of the hook 10 allows it to engage objects, such as that indicated as 28' in FIG. 11, having a thickness greater than the distance between the throat portion of the shank 46 and the tip 30 of the tine 44. Because the tooth at the tip 30 projects in a direction substantially parallel to the flattened throat portion 46 of the shank 34, and because the rope 22 extends from the first end of the shank 38 in substantially the same direction, a pull on the rope 22 by the boat operator 12 causes the tooth 30 to directly engage, or even slightly indent, the side of the object 28'. The preferred embodiment of the hook 10 may easily be rigged to engage large objects or objects having no definite edge, such as a dock pile indicated as 62 in FIG. 1. FIG. 12 shows the manner in which a loop portion 64 may be formed in the end of the rope 22 and placed over the tine 44 of the hook 10 to form a slip-/loop area 66 at the end of the rope 22. An engaging loop may also be formed by increasing the length of the rope which extends from the second end of the shank 42, thereby enlarging the loop area 68 as indicated in FIG. 9.

The object-engaging action of the hook 10 is illustrated sequentially in FIGS. 13–16. Movement arrows indicate the action that takes place when the rope 22 is retracted by the boat operator 12. In FIG. 13 the hook 10 is shown having been thrown over an edge 70 of an object 28. The movement arrows indicate that the rope 22 is being retracted and the hook is rising relative to the edge 70 of the object 28. In FIG. 14 the beveled first end 38 of the shank 34 is shown meeting the edge 70 of the object 28. As the rope 22 continues to be retracted, the angle of the first end 38 of the shank 34, in combination with the weight of the tine 44, causes the hook 10 to rotate such that the tine 44 and the flat throat portion of the shank 46 is oriented to engage the object 28. FIGS. 15 and 16 show the hook 10 continuing to be pulled into engaging contact with the object 28. The same self-aligning action takes place whether the hook 10 is attached to the rope 22 by means of the knotted end 60 as shown in FIGS. 11 and 13–16 or by the end capture means illustrated in FIGS. 1–3, 9 and 10. FIG. 16 shows the object 28 being engaged within the throat 32 of the hook 10. Similar self-alignment and engagement will occur when the thickness of the object, such as 28' in FIG. 11, is greater than the distance between the flattened portion of the shank 46 and the tip of the tine 30.

The construction and function of an alternative embodiment of the hook is shown in FIGS. 17 and 18. Shown therein is a hook substantially identical to that described above having, additionally, a tipping member 72 which projects from the shank 34' at a position which is adjacent to the first end 38 and diametrically opposed to the projection of the tine 44. Should the hook 10, having been thrown over an edge 70 of an object 28, be retracted such that the tine 44 is directly opposite the object 28, the tipping member 72 will initiate rotation of the shank 34' such that the cooperation between the beveled first end 38 of the shank 34' and the weight of the tine 44 will cause the hook 10 to rotate such that the tine 44 and the flat throat portion of the shank 46 are oriented to engage the object 28.

The embodiments illustrated and described herein, as well as the specific uses thereof, are intended to be for example only and, therefore, nonlimitive. Accordingly, the protection of my invention is to be limited only to the extent that it is defined in the following claims, interpreted in accordance with the established principles of patent claim interpretation, including use of the doctrine of equivalents.

What is claimed is:

1. A hook, attachable to an end of a rope, comprising:
   an elongated shank having first and second ends, and a rope receiving means including an end opening in the first end of the shank;
   a tine having a first end fixed to the second end of the shank and a second free end spaced from said shank;
   said shank and said tine defining a hook throat between them;
   said shank having a substantially wide and flat throat surface directed toward the tine; and
   said first end of said shank including an oblique end surface surrounding the end opening, said surface intersecting and forming an obtuse angle with the flat throat surface of the shank;
   whereby in use the hook is secured to a rope, and the rope extends out from the opening in the first end of the shank, and the rope is held while the hook is thrown over an object, the rope is then retracted to pull the hook back toward the object and bring said oblique end surface at the first end of the shank into contact with the object, and wherein the oblique end surface and the tine are positioned relative to each other such that the contact of the oblique end surface with the object and the weight of the tine cooperate to rotate the hook such that the tine will engage the object.

2. The hook described in claim 1, wherein the shank is tubular and includes a second end opening in its second end.

3. The hook described in claim 2, having a third opening in a sidewall portion of the tubular shank diametrically opposite the flat throat surface.

4. The hook described in claim 1, wherein the tine includes a substantially laterally flat web defining the hook throat and an outer rib portion substantially perpendicular to said web and with said web providing the tine with a substantially T-shape cross-section.

5. The hook described in claim 4, wherein the web of the tine comprises a straight portion at said second free end of the tine and an arcuate portion between said straight portion and said shank.

6. The hook described in claim 5, wherein said straight portion of said web is tapered to decrease in width approaching said second free end of said tine.

7. The hook described in claim 6, wherein said rib portion of said tine is beveled substantially in a direction parallel to said shank to form a tooth at the free end of the tine.

8. The hook described in claim 7, wherein the shank is tubular and includes a second end opening in its second end.

9. The hook described in claim 8, having a third opening in a sidewall portion of the tubular shank.

10. The hook described in claim 1, further comprising a shank orienting means on said shank adjacent to the first end of the shank and opposite said throat surface of the shank,
    said shank orienting means including an outward projection shaped to cause the shank to rotate away from a position wherein said tine is oriented on the shank directly opposite the object, and to rotate the tine toward the object.

11. The hook described in claim 1, further comprising a rope within said rope receiving means extending through said end opening.

12. The hook described in claim 11, wherein the web of the tine has a substantially flat surface at the hook throat and an outer portion substantially perpendicular to the said throat surface of the tine, wherein the tine is substantially T-shaped in cross section,
    said tine comprises a straight portion at said second free end of the tine and an arcuate portion between said straight portion and said shank, said straight portion being tapered to decrease in width approaching the second free end of the tine,
    said second free end of the tine being beveled to form a tooth substantially in a direction parallel to said shank.

13. The hook described in claim 12, wherein said shank is tubular and includes a second end opening in its second end, and said rope passes through said shank into the first end, out of the second end and a knot is formed in said rope such that the knot will not allow the end of the rope to pass back through said shank.

14. The hook as described in claim 12, wherein said shank has a second opening at said second end and said shank is substantially tubular, and a third opening formed in a sidewall of said tubular shank, wherein said rope is attached to the hook by passing an end into said first opening, through the shank, out of said second opening, and then passing the end of the rope under a portion of the rope exposed by the third opening in said shank, such that pull on the rope causes the end of the rope to be captured between the rope and the shank.

15. The hook described in claim 11, wherein said rope extends completely through the tubular shank and includes a knot outwardly adjacent the second end of the tubular shank which is larger than the passageway in the tubular shank.

16. The combination described in claim 11, wherein said rope extends completely through the tubular shank and has an eye on a portion of the rope which extends from the second end of the tubular shank which is engageable with the tine to form a loop, the size of which can vary by movement of the rope one way or the other through the passageway in the tubular shank.

17. The combination of claim 11, wherein the tubular shank includes a window opening communicating with the central passageway at a location between the first and second ends of the tubular shank, and the rope extends completely through the passageway in the tubular shank, and a portion of the rope is exposed at the window and extends as a loop through the window and another portion of the rope which extends outwardly from the passageway at the second end of the shank is bent back on the shank and then extends laterally of the shank, through said loop, and a main portion of the rope extends out from the end of the tubular passageway that is at the first end of the tubular shank.

* * * * *